Nov. 10, 1936.  G. ANDREWS  2,060,714
PNEUMATIC INNER TUBE
Filed July 2, 1935  2 Sheets-Sheet 1

Inventor
Garnett Andrews
By Watts T. Estabrook
His Attorney

Nov. 10, 1936.  G. ANDREWS  2,060,714
PNEUMATIC INNER TUBE
Filed July 2, 1935  2 Sheets-Sheet 2

Fig. 11

Inventor
Jarnett Andrews
By Watts T. Estabrook
Attorney

Patented Nov. 10, 1936

2,060,714

UNITED STATES PATENT OFFICE 2,060,714

PNEUMATIC INNER TUBE

Garnett Andrews, Nashville, Tenn.

Application July 2, 1935, Serial No. 29,524

3 Claims. (Cl. 152—13)

My invention relates to an improvement in puncture healing inner tubes for pneumatic tires and consists in causing a portion of the rubber in the protected area of the tube to be placed in compression longitudinally of the tube and to lie normally or approximately normally in cross-section and to place a portion of the rubber in the protected area of the tube to be placed in compression in cross-section, and to lie normally or approximately normally circumferentially of the tube, and to place the remaining portion of the protected area in compression both longitudinally and in cross-section of the tube, upon the tube being inflated in a casing.

This is accomplished by forming the protected area of the tube of rows or series of raised areas and depressions, the ends of the depressions, where they lie adjacent to the ends of the depressions in the other rows or series, terminating in an arc or arcs.

In the designs of tubes heretofore invented with a view of causing the protected area to be in compression and thereby closing punctures, the protected area of the tube in cross-section is limited theoretically to an arc of 114.5912 degrees, and in practice the protected area in cross-section covers a considerably shorter arc, being limited to approximately 100 degrees. It is the purpose of my invention to extend the arc of the protected area in cross-section to any number of degrees desired, up to the full circumference of the tube in cross-section.

The novel features of construction and combinations of parts of which my invention consists will be hereinafter described and pointed out.

In the accompanying drawings, wherein similar reference characters refer to similar parts throughout the several views, Fig. 1 shows cross-sectional view of a tube along the line MM in Fig. 4, in which the arcs at the ends of the depressions do not protrude beyond the arc of the circle cutting the raised areas.

Fig. 11 is the same piece of rubber shown in Fig. 10, the arc having been pressed to a plane.

In order to understand the various actions of the rubber in the protected area upon the tube being inflated in a casing, it will be necessary to consider: 1. The form of the raised areas; 2. The form of the depressions; and, 3. The form of the arc or arcs; of which the protected area is made up, and the effect these particular forms will have in producing compression upon the tube being inflated in a casing.

It is well to bear in mind, in considering the subject of closing or tending to close punctures by placing the tread of the protected area of a tube under compression, that if a piece of rubber is put under very high compression in one direction, it will take only a very slight stretch at right angles to such compression to destroy the puncture healing effects of such compression. It is therefore necessary that the portion of the tube which is to have a tendency to close punctures (the protected area) should be under compression both longitudinally and in cross-section, or be in compression longitudinally and lie normally in cross-section, or be in compression cross-sectionally and lie normally longitudinally.

My invention consists in forming a tube with a protected area embodying these principles.

Compression takes place in the raised and depressed portions of the tube upon its being inflated in a casing. This will become apparent in examination of Fig. 4, which is a detailed view in elevation of vertical section of inner tube shown in Fig. 2 in a deflated state along line MM of Fig. 2. E and E' represent the crests of two adjacent raised areas, and F and F' represent the bottoms or troughs of two adjacent depressions. The curved line EF'E', representing a line drawn longitudinally along the surface of the tube, beginning at the crest of one depression E through the trough F' to the crest of the adjoining depression E', is longer than arc ELE', which is the position that the depression will assume upon the tube being inflated in a casing, the arc ELE' representing the inner surface of the casing. Since the arc ELE' is shorter than the curved line EF'E', the section of the tube represented by EF'E' will be in compression longitudinally of the tread upon the tube being inflated in a casing, at which time the line EF'E' will have been shortened to the length of the arc ELE'. The same wil take place in each of the depressions throughout the length of the tread. The same will be true of any line drawn longitudinally of the tread cuting the raised areas and depressions.

In this connection it should be noted that the longitudinal compression is built against compression throughout the tread of the tube and is not built against artificial barriers.

Figure 4:
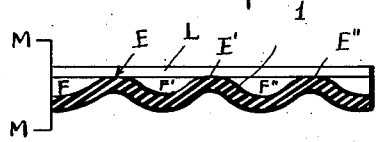
Fig. 4 is a detailed view in elevation of a vertical section of the inner tube in a deflated state, along the line MM in Figs. 2 and 3.

Any amount of longitudinal compression can be built in the raised areas and depressions by varying the depths of the depressions in relation to the distances between the points E and E' of Fig. 4, or by changing the form of the curved line EF'E'.

Figure 2:
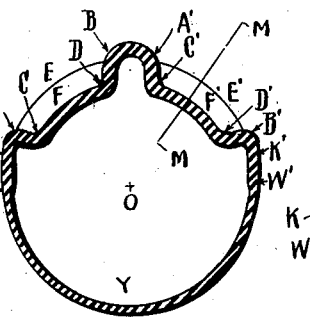
Fig. 2 is a cross-sectional view of the tube cut along line MM of Fig. 4, in which the arcs at the ends of the depressions protrude beyond the arc cutting the raised areas.

I want it distinctly understood that I do not limit the design of the tread of the tube when viewed longitudinally along the line MM of Fig. 2 to the design shown in Fig. 4, but that the crests of adjacent raised areas E and E' may be nearer together or farther apart than that shown in Fig. 4, or the depth of the depression may be greater or less than that shown in Fig. 4, or the curved surface EF'E' may take a different form from that shown in Fig. 4.

Figure 1:
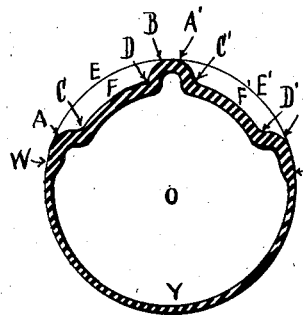
Figure 3:
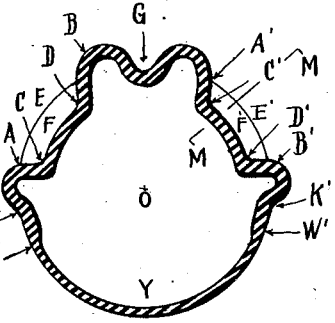
Fig. 3 is a similar view to Fig. 2, showing a tube with two arcs between the adjacent ends of two rows of depressions and with different forms of arcs AK and B'K'.

Except for modification of the rubber contained in the ends of the depressions, the depressions will lie normally or approximately normally in cross-section, upon the tube being inflated in a casing. This will become apparent upon examination of Figs. 1, 2 and 3. In Figs. 1, 2 and 3, AEB and A'E'B' represent the raised areas of the tube viewed cross-sectionally along line MM of Fig. 4. The tube is so formed that these raised areas, upon the tube being inserted in the proper sized casing, in an uninflated or slightly inflated condition, will fit against or approximately against the inner surface of the casing. Lines ACFDB and A'C'F'D'B' represent the contour of a depression when viewed in cross-section along the line MM of Fig. 4. The arcs CFD and C'F'D' represent the bottoms or troughs of the depressions, the points A, B, A' and B' represent the outer ends of the depressions.

By forming the depressions so that the end AC plus the trough CFD plus the end DB will equal the length of the raised area AEB, the depression will lie normally in the arc AEB, which rests against the inner surface of the casing upon the tube being inflated in the casing. One way of accomplishing this is to form the trough of the depression CFD with an arc drawn from a common center O, from which the raised area, arc AEB, is swung. In other words, forming the arcs CFD and AEB as segments of two concentric circles, and forming the ends AC and DB so that they will take the general direction of radii drawn from the cross-sectional center, or if desired, turning outwardly from the arc CFD.

I wish it distinctly understood that I do not confine the form of the depressions, when viewed in cross-section, to the forms shown in Figs. 1, 2 and 3. The ends of the depressions may take different directions from those shown in the drawings, or the ends may be formed of curved lines or straight lines, or a combination of curved lines and straight lines, and the troughs of the depressions may be formed with curved lines, curved and straight lines, or straight line, as may best meet the needs of the manufacturer in accomplishing the desired result, which is to allow the depressions to lie normally or approximately normally in cross-section upon the tube being inflated in a casing, this result being secured by forming the depressions so that when they are viewed in cross-section in an uninflated condition, the contour of each depression will consist of a broken line composed of curved or straight lines or curved and straight lines, the length of which will be equal to or approximately equal to the length of the raised areas in cross-section.

Figure 5:
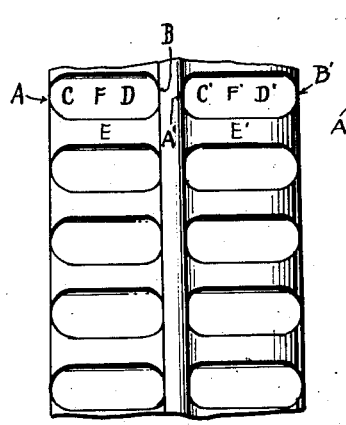
Fig. 5 is a view of the tread of an uninflated tube in which the depressions lie transverse of the tread and in line with each other.

From the foregoing discussion it will be observed that the tread or protected area of the tube is made up of two or more rows of depressions and raised areas, the lengths of the raised areas and depressions, when the tube is in an uninflated or slightly inflated condition, being of approximately the same length in cross-section of the tube, which rows are joined or connected by an arc or arcs running longitudinally of the tread. The depressions and raised areas of the tube can have several arrangements with relation to the depressions and raised areas in the adjacent row or rows and in relation to the arc or arcs connecting the adjacent ends of the depressions and raised areas, some of these arrangements being as follows:

Fig. 5 is a flat view of the protected area of a tube shown in Figs. 1 and 2 in an uninflated condition, the letters in Fig. 5 corresponding with the lettering in Figs. 1 and 2. In the design here shown the depressions and raised areas in both rows lie at right angles with and terminate in the arc or arc-shaped rib DBA'C', and the depressions and raised areas in one row are in line with respect to the raised areas in the adjacent row in cross-section.

Figure 6:
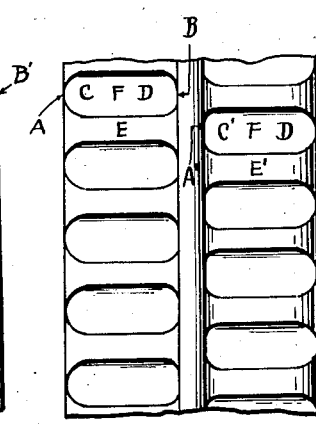
Fig. 6 is a view of the tread of an uninflated tube in which the depressions lie transverse of the tread and being staggered with relation to each other.

Fig. 6 is a flat view of the protected area of a tube shown in Figs. 1 and 2 in an uninflated condition, the letters in Fig. 6 corresponding with the lettering in Figs. 1 and 2. In the design here shown the depressions and raised areas in both rows lie at right angles with and terminate in the arc DBA'C', and the depressions and raised areas in one row are staggered with relation to the depressions and raised areas in the adjacent row in cross-section.

Figure 7:
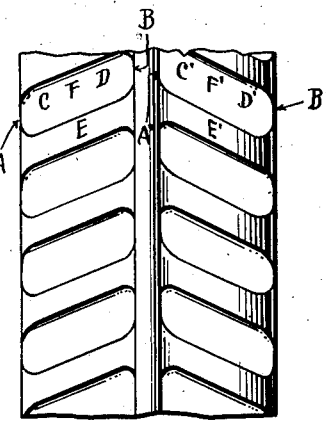
Fig. 7 is a view of the tread of an uninflated tube in which the depressions lie obliquely with relation to the arcs at the ends of the depressions.

Fig. 7 is a flat view of the protected area of a tube shown in Figs. 1 and 2 in an uninflated condition, the letters in Fig. 7 corresponding with the lettering in Figs. 1 and 2. In the design here shown the depressions and raised areas in both rows lie obliquely to and terminate in the arc DBA'C' and the depressions and raised areas in one row lie obliquely with relation to the depressions in the adjacent row.

Figure 8:
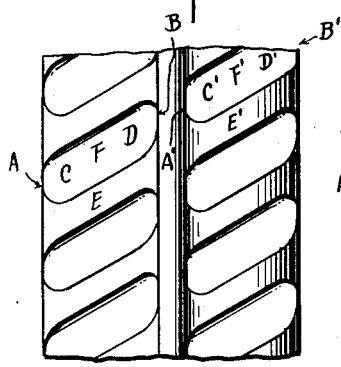
Fig. 8 shows the tread of an uninflated tube in which the depressed areas lie obliquely with relation to the arcs at the ends of the depressions, but arranged differently from that shown in Fig. 7.

Fig. 8 is a flat view of the protected area of a tube shown in Figs. 1 and 2 in an uninflated condition, the letters in Fig. 8 corresponding with the lettering in Figs. 1 and 2. In the design here shown the depressions and raised areas in both rows lie obliquely to and terminate in the arc DBA'C' and the depressions and raised areas in one row lie in line with relation to the depressions and raised areas in the adjacent row.

Figure 9:
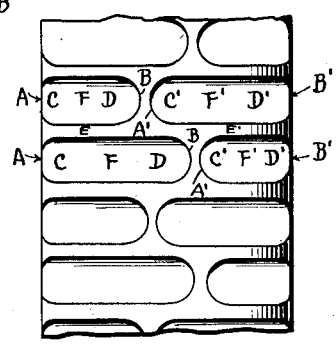
Fig. 9 shows the tread of an uninflated tube in which the depressions in one row are interlocked with the depressions in the adjacent row.

Fig. 9 shows the tread of an uninflated tube in which the depressions in one row are interlocked with the depressions in the adjacent row.

My invention is not limited to the shapes of the depressions as shown in Figs. 5, 6, 7, 8 and 9, but the corners may be squared, rounded, obtuse or acute, as may be necessary to bring about the proper functioning between the depressions and the arcs in which the depressions terminate.

I also wish it distinctly understood that I do not confine my invention to a tube the protected area of which is made up of two rows or series of raised areas and depressions as shown in Figs. 1, 2, 3, 5, 6, 7, 8, and 9, but the protected area may be made up of two or more rows or series of raised areas and depressions, up to and including the entire surface of the tube in cross-section if so desired.

The balance of the protected area which is not made up of the raised and depressed portions just discussed is made up of arcs at the ends of the depressions, and the outer surface of these arcs will also be placed in compression in cross-section and lie normally or approximately normally longitudinally of the tread upon the tube being inflated in the proper sized casing. This will become apparent upon examination of Figs. 10 and 11.

The functions of the arcs at the ends of the raised areas and depressions, or at the ends of the depressions, play a very important part in relation to the balance of the protected area, as I will now explain.

Figure 10:
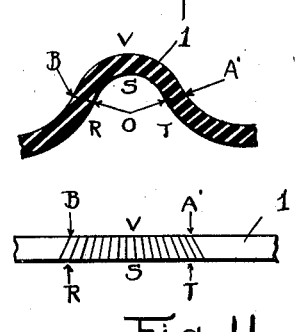
Fig. 10 is a cross-sectional view of a piece of rubber (1) vulcanized in the form of an arc.

If a piece of rubber (1) is vulcanized in the form of an arc, as shown in Fig. 10, and the arc is flattened out, taking the position as shown in Fig. 11, the inner surface of the arc RST (Fig. 10) will be stretched as shown in straight line RST (Fig. 11). This stretch on the inner surface RST will cause contraction or compression to be built in the outer surface BVA', as shown in Fig. 11. The extent to which the surface BVA' (Fig. 10) will be shortened will depend upon the relation between radius OT and radius OA'. This difference is governed by the relation of the length of the radius OT to the thickness of the rubber in the arc. If the length of the radius OT is equal to the thickness of the rubber (Fig. 10), the compression built in the arc BVA' will be greater than will be the case if the length of the radius OT is twice the thickness of the rubber.

This principle is embodied in my invention by forming the adjacent depressions so that the ends thereof terminate in arc BA', as shown in Figs. 1 and 2, or the space between the ends is formed of two or more arcs as shown in Fig. 3. The outer surfaces of these arcs will be placed in cross-sectional compression by being flattened out against the inner surface of the casing, upon the tube being inflated in the casing. Since the length of the arcs will be equal to or approximately equal to the perimeter of the inside of the casing, they will lie normally or approximately normally longitudinally of the tread upon the tube being inflated in a casing.

Figure 12:
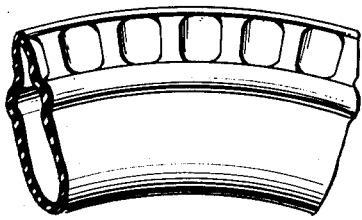
Fig. 12 is a detailed view of the outside section of an uninflated tube, cross-section of which is shown in Fig. 2.
Figure 13:
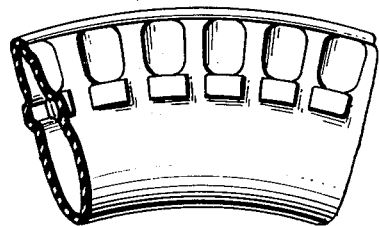
Fig. 13 is a detailed view of the outside section of an uninflated tube, with buttons at the outer ends of the depressions, instead of a bead as is shown in Fig. 12.

In addition to forming arcs at the ends of adjacent depressions, arcs may be formed at the ends of depressions which are not adjacent to other depressions, these arcs or fullness forming either a continuous bead throughout the length of the tube as shown in Fig. 12, or take the shape of buttons at the ends of the depressions as shown in Fig. 13.

I wish it distinctly understood that my invention is not limited to the types of arcs as shown in Figs. 1, 2 and 3, but said arcs may be larger or smaller in relation to the depressions above shown, or may be made up of a segment of a circle or segments of circles combined, or take some other form that may be found expedient in the design of a tube, the important thing being that the inner surface RST shall have a lesser length than the outer surface BVA', as shown in Fig. 10. Also that the space between the adjacent ends of the depressions may be made up of one, two, or more arcs.

From the foregoing it will be seen that the entire tread or protected area is made up of raised areas, depressions and arcs, and that these raised areas, depressions and arcs are so correlated as to cause every part of the tread or protected area to be under compression in one direction and to lie normally or be in compression in the opposite direction, upon the tube being inflated in a casing, which will have a tendency to close punctures throughout the protected area.

It will be noted that in cross-sectional designs shown in Figs. 1, 2, and 3, the protected area is made of thicker material than the balance of the tube WYW'. While this will be found to be advantageous in the design of the tube, my patent is not limited to such construction, as the entire periphery of the tube may be formed of the same thickness rubber when viewed in cross-section, or the tread be made of thinner rubber than the balance or body thereof.

The balance or body of the tube KYK', shown in Figs. 1, 2, and 3, may take any desired shape, and no claim is made as to that portion of a tube.

Having described my invention, what I claim as new and desire to secure by Letters Patent is:

1. An inner tube for use in pneumatic tires comprising an endless tubular member of elastic material, including a protected area made up of two or more circumferentially extending rows of transversely disposed alternating raised and depressed portions, the raised portions upon the tube being inserted in a proper sized casing in an uninflated or slightly inflated condition fitting against or approximately against the inner surface of the casing, the contour of each depression in cross-section, when the tube is uninflated being a line composed of joined components having a greater length than a depression of equal depth formed by a curved line connecting the outer ends of the depression, and an arc-shaped rib formed in said protected area between the rows of depressions and raised portions for joining the rows together so that the protected area will be in compression longitudinally and lie normally or approximately normally in cross-section upon the tube being inflated in a casing.

2. An inner tube for use in pneumatic tires comprising an endless tubular member of elastic material, including a protected area made up of a plurality of circumferentially extending rows of alternating raised portions and depressions, and lying at an angle to the central plane of the tube with respect to the protected area, the raised areas upon the tube being inserted in the proper sized casing in an uninflated or slightly inflated condition, fitting against or approximately against the inner surface of the casing, the contour of each depression in cross-section, when the tube is uninflated being a line composed of joined components having a greater length than a depression of equal depth formed by a curved line connecting the outer ends of the depression, and an arc-shaped rib running longitudinally of the tread formed in said protected area between the rows of depressions and raised portions for joining the rows together so that the protected area will be in compression longitudinally and lie normally or approximately normally in cross-section upon the tube being inflated in a casing.

3. An inner tube for use in pneumatic tires comprising an endless tubular member of elastic material, including a protected area made up of a plurality of circumferentially extending rows of alternating raised portions and depressions, and the contour of each depression in cross-section, when the tube is uninflated, being of approximately the same length as a line drawn along the crest of the raised areas, and an arc-shaped rib formed in said protected area between the rows of raised and depressed portions for creating a fullness at the inner ends of the depressed and raised portions of each row so that the protected area will be in a state of compression upon the inflation of the tubular member.

GARNETT ANDREWS.